United States Patent
Hwang

(10) Patent No.: US 7,139,439 B2
(45) Date of Patent: Nov. 21, 2006

(54) METHOD AND APPARATUS FOR GENERATING TEXTURE FOR 3D FACIAL MODEL

(75) Inventor: Eui-hyeon Hwang, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 769 days.

(21) Appl. No.: 10/318,089

(22) Filed: Dec. 13, 2002

(65) Prior Publication Data

US 2003/0113036 A1    Jun. 19, 2003

(30) Foreign Application Priority Data

Dec. 13, 2001  (KR) ............... 2001-78963

(51) Int. Cl.
G06K 9/36  (2006.01)
(52) U.S. Cl. ............... 382/285; 345/423; 345/582
(58) Field of Classification Search ............... 382/118, 382/285, 294; 345/423, 427, 582
See application file for complete search history.

(56) References Cited

U.S. PATENT DOCUMENTS 6,016,148 A    1/2000  Kang et al.
6,903,782 B1 *  6/2005  Herman et al. ............. 348/625

FOREIGN PATENT DOCUMENTS

| GB | 2 336 735 A | 10/1999 |
| GB | 2336735 A * | 10/1999 |
| KR | P2001-084670 | 9/2001 |
| WO | WO 95/03855 | 2/1995 |

OTHER PUBLICATIONS

Escher et al. ("Automatic 3D Cloning and Real-Time Animation of a Human Face," IEEE Proc. Computer Animation, Jun. 5-6, 1997, pp. 58-66).*

Pighin et al. ("Synthesized Realistic Facial Expressions from Photographs," Proc. 25th Conf. on Computer Graphics and Interactive Techniques, Jul. 1998, pp. 75-84).*

Cheng et al. ("An Integrated Approach to 3D Face Model Reconstruction from Video," IEEE ICCV Workshop on Recognition, Analysis and Tracking of Faces and Gestures in Real-Time Systems, Jul. 13, 2001, pp. 16-22).*

Nagashima et al. ("3D Face Model Reproduction Method Using Multi View Images," SPIE vol. 1606 Visual Communications and Image Processing '91, pp. 566-573).*

* cited by examiner

Primary Examiner—Jingge Wu
Assistant Examiner—Yubin Hung
(74) Attorney, Agent, or Firm—Buchanan Ingersoll & Rooney PC

(57) ABSTRACT

A method and an apparatus for generating textures for a three-dimensional (3D) facial model are provided. The method for generating textures for a 3D facial model provides extracting texture coordinate from a magnification result of a predetermined central facial portion by a predetermined rate and a reduction result of peripheral portion by the predetermined rate, by substituting transformed model coordinate generated by transforming a standard model for a frontal image and at least one side face image of a face into a conversion function in order to convert the transformed model coordinate into pixel coordinate; and interpolating the frontal and side face image, which is received from a user in response to the analysis result of the transformed model coordinate, by using the texture coordinate in the unit of polygon, which is decided by the pixel coordinate, to determine the interpolation result as transformed texture, in which the central facial portion is a region established by a user with centering upon the eyes of the face and the peripheral portion is a region corresponding to the region except for the central facial portion of the face.

39 Claims, 12 Drawing Sheets

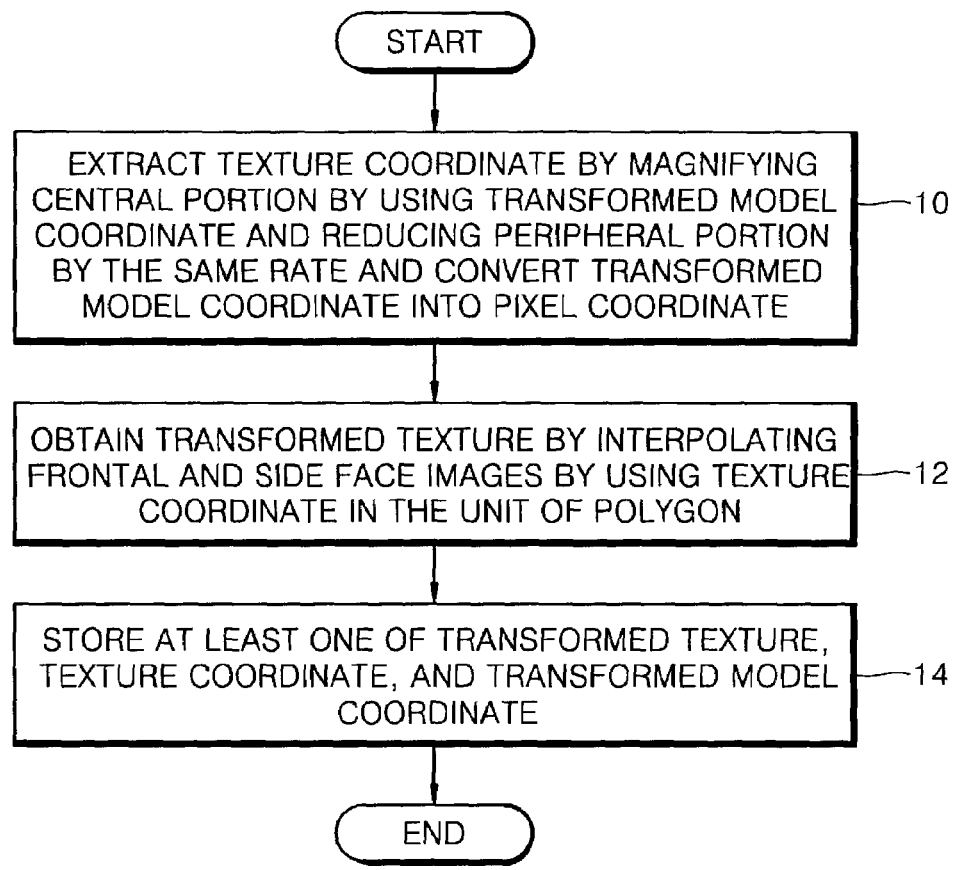
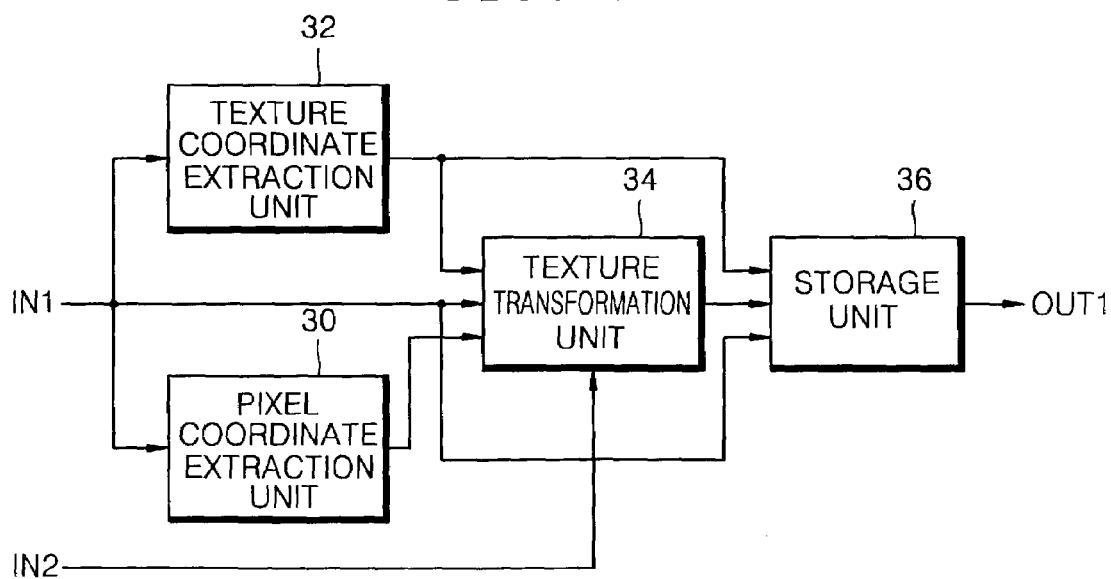

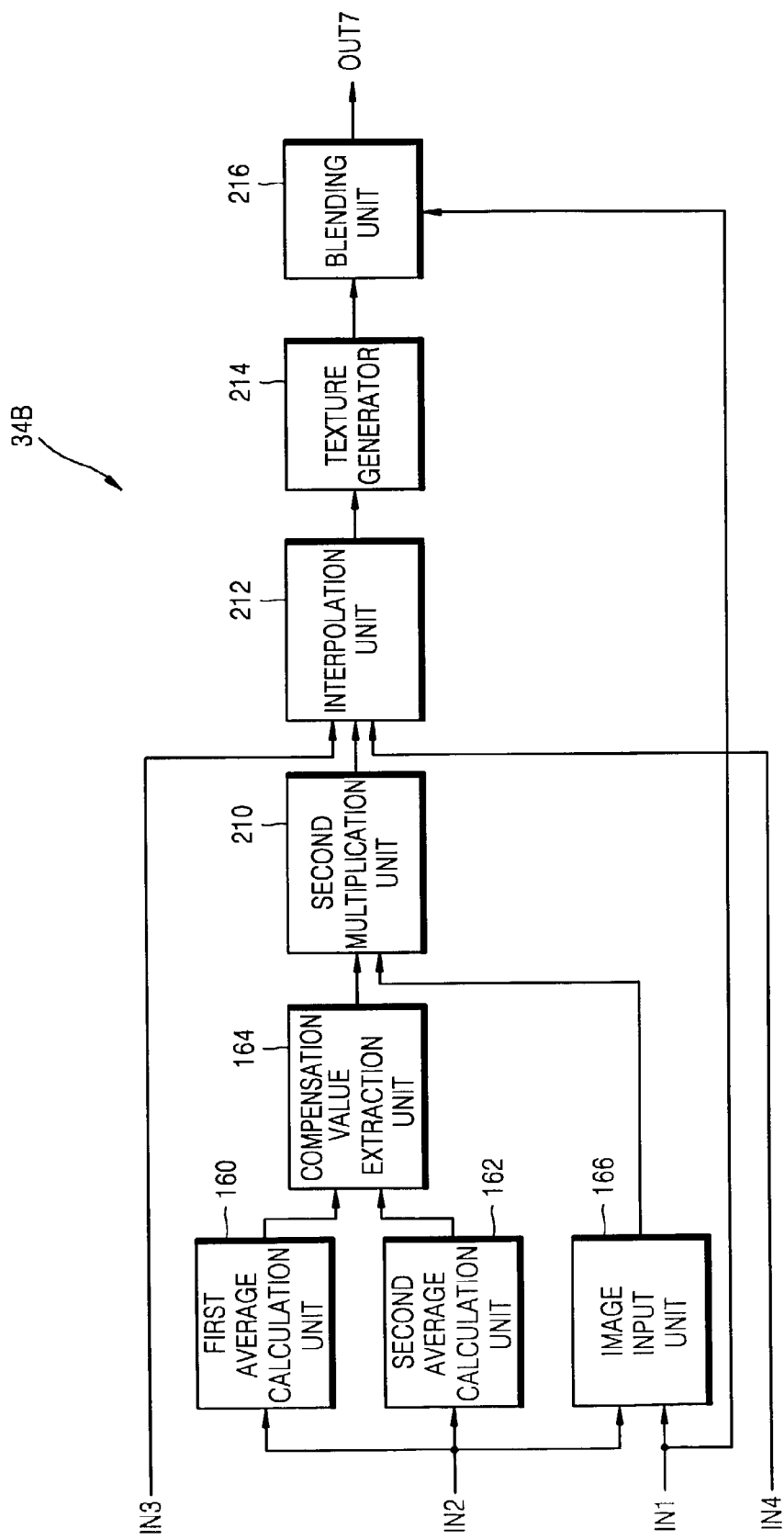

METHOD AND APPARATUS FOR GENERATING TEXTURE FOR 3D FACIAL MODEL

BACKGROUND OF THE INVENTION

This application claims the priority of Korean Patent Application No. 2001-78963, filed Dec. 13, 2001 in the Korean Intellectual Property Office, which is incorporated herein in its entirety by reference.

1. Field of the Invention

The present invention relates to image processing, and more particularly, to a method and an apparatus for generating textures required for mapping a two-dimensional (2D) facial image to a three-dimensional (3D) facial model.

2. Description of the Related Art

Since faces have many curves and people easily catch face differences by subtle changes thereon, 3D facial modeling is very difficult. Generally, 3D facial models are generated and used in two different fields.

First, 3D facial models are generated for movies. In this case, the facial models must have excellent quality but do not require real time generation. Accordingly, the texture quality of 3D facial models can be improved only by increasing the size of the texture for the facial models.

Second, 3D facial models are generated for games or mobile devices. Here, mobile devices generate 3D facial models by using a limited amount of resources and generate real time animations, for example, avatars using the facial models. Although game devices or computers process facial images at an improved speed while not limiting resources as compared with mobile devices, due to technology improvements thereof, the game devices or the computers cannot but use a limited amount of resources because the game devices or the computers have to generate real time models as compared with the first field.

A first conventional method for generating textures for a 3D facial model uses a simple cylindrical coordinates conversion process. In this case, the textures corresponding to a 3D facial image are only one eighth of the overall textures of a 3D head image. In other words, a facial image occupies about 50% of a head image in a vertical direction and about 25% of a head image in a horizontal direction. Since people catch differences between facial models via the portions around the eyes in the facial models, the first conventional method wastes textures corresponding to unnecessary portions among entire textures.

A second conventional method for generating textures compresses the textures used for generating a 3D facial model. Therefore, the second conventional method requires a separate apparatus for recovering the compressed texture before using them.

A third conventional method for generating textures reduces the absolute sizes of textures when the amount of resources is limited. Accordingly, the third conventional method deteriorates the quality of the textures for a 3D facial model.

SUMMARY OF THE INVENTION

The present invention provides a method for generating textures for a three-dimensional (3D) facial model so as to generate textures required for mapping two-dimensional (2D) facial images to a 3D facial model by placing importance on portions in which users are interested and using the portions in which the users are not interested.

The present invention also provides an apparatus for generating textures for a 3D facial model to perform a method for generating textures for a 3D facial model.

According to an aspect of the present invention, there is provided a method for generating textures for a three dimensional (3D) facial model, the method comprising: extracting texture coordinate from a magnification result of a predetermined central facial portion by a predetermined rate and a reduction result of peripheral portion by the predetermined rate, by substituting transformed model coordinate generated by transforming a standard model for a frontal image and at least one side face image of a face into a conversion function in order to convert the transformed model coordinate into pixel coordinate; and interpolating the frontal and side face image, which is received from a user in response to the analysis result of the transformed model coordinate, by using the texture coordinate in the unit of polygon, which is decided by the pixel coordinate, to determine the interpolation result as transformed texture, wherein the central facial portion is a region established by a user with centering upon the eyes of the face and the peripheral portion is a region corresponding to the region except for the central facial portion of the face.

According to another aspect of the present invention, there is provided an apparatus for generating textures for a 3D facial model, the apparatus comprising: a texture coordinate extraction unit for inputting transformed model coordinate generated by transforming a standard model for a frontal image and at least one side face image of a face, magnifying a predetermined central facial portion by a predetermined rate and reducing peripheral portion by the predetermined rate by substituting the input transformed model coordinate into a conversion function, and outputting the magnification and reduction results as texture coordinates; a pixel coordinate extraction unit for converting the transformed model coordinate into pixel coordinate to output the converted pixel coordinate; and a texture transformation unit for analyzing the transformed model coordinate, receiving the frontal or side face image from a user in response to the analysis result, interpolating the frontal or side face image by using the texture coordinate, in the unit of polygon, which is decided by the pixel coordinate, and outputting the interpolation result as transformed texture, wherein the central facial portion is a region established by the user with centering upon the eyes of the face and the peripheral portion is a region corresponding to the region except for the central facial portion of the face.

BRIEF DESCRIPTION OF THE DRAWINGS

The above aspects and advantages of the present invention will become more apparent by describing in detail preferred embodiments thereof with reference to the attached drawings in which:

FIG. 1 is a flowchart for explaining a method for generating textures according to the present invention;

FIG. 2 is a block diagram illustrating an apparatus for generating textures according to the present invention to perform the method of FIG. 1;

FIG. 15 is a block diagram illustrating the texture transformation unit for the method of FIG. 12 according to the second embodiment of the present invention.

DETAILED DESCRIPTION OF THE INVENTION

A method for generating textures for a three-dimensional (3D) facial model and the configuration and operation of an apparatus for generating textures in which the method is performed according to the present invention will now be described with reference to the accompanying drawings.

FIG. 1 is a flowchart for explaining a method for generating textures and includes obtaining texture coordinates and pixel coordinates in step 10, transforming textures in step 12, and storing the transformed textures in step 14.

FIG. 2 is a block diagram illustrating an apparatus for generating textures according to the present invention, in order to perform the method of FIG. 1, and includes a pixel coordinates extraction unit 30, a texture coordinates extraction unit 32, a texture transformation unit 34, and a storage unit 36.

Figure 3A:
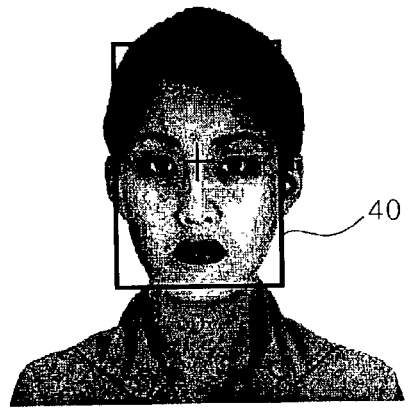
FIGS. 3A through 3C are views for explaining a central facial portion.
Figure 3B:
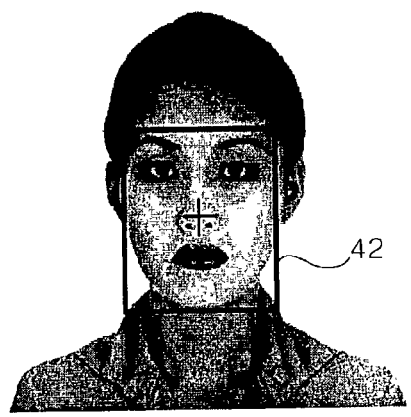
Figure 3C:
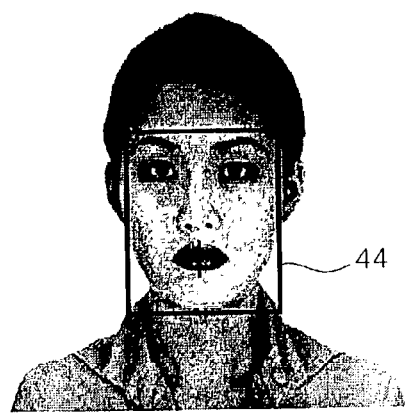

FIGS. 3A through 3C are views for explaining a central facial portion.

In a method for generating textures for a 3D facial model according to the present invention, texture coordinates are extracted from the magnification result of a predetermined central facial portion by a predetermined rate, and the reduction result of a peripheral portion by a predetermined rate, by substituting transformed model coordinates into a conversion function, and then the transformed model coordinates are converted into pixel coordinates in step 10. Here, the transformed model coordinates are generated by transforming a standard model for a frontal image generated by photographing a face at front and side face images generated by photographing a face from lateral, i.e., from right side and/or left side. The generation of transformed model coordinates is disclosed in Korean Patent Application No. 2000-9867 titled "A method and an apparatus for mapping textures from 2D facial images into a 3D facial model".

According to the present invention, the central facial portion is a region established by a user, in which the user is interested, i.e., a region having the eyes at its center. The peripheral portion is a region in which the user is not interested, i.e., a region except for the central facial portion of a face. For example, a central facial portion 40 is established with the center "+" at the center point between the eyes, as shown in FIG. 3A. A central facial portion 42 can be established with a center "+" at the nose to include a region from eyebrows to chin in a vertical direction and between the outer ends of the eyes in a horizontal direction, as shown in FIG. 3B. Here, the center "+" can be changed by a user, so that the central facial portion 40 or 42 can be moved by the user, for example, a central facial portion 44 can be established with the center "+" at the mouth as shown in FIG. 3C, when a user thinks that a portion including the mouth is important.

In order to perform step 10, an apparatus for generating textures may include a pixel coordinates extraction unit 30 and a texture coordinates extraction unit 32, as shown in FIG. 2.

Here, the pixel coordinates extraction unit 30 converts transformed model coordinates input through an input terminal IN1 into pixel coordinates and outputs the converted pixel coordinates to a texture transformation unit 34. Step 10 of FIG. 1 and the pixel coordinates extraction unit 30 of FIG. 2 according to the preferred embodiments of the present invention will now be described with reference to accompanying drawings.

Figure 4:
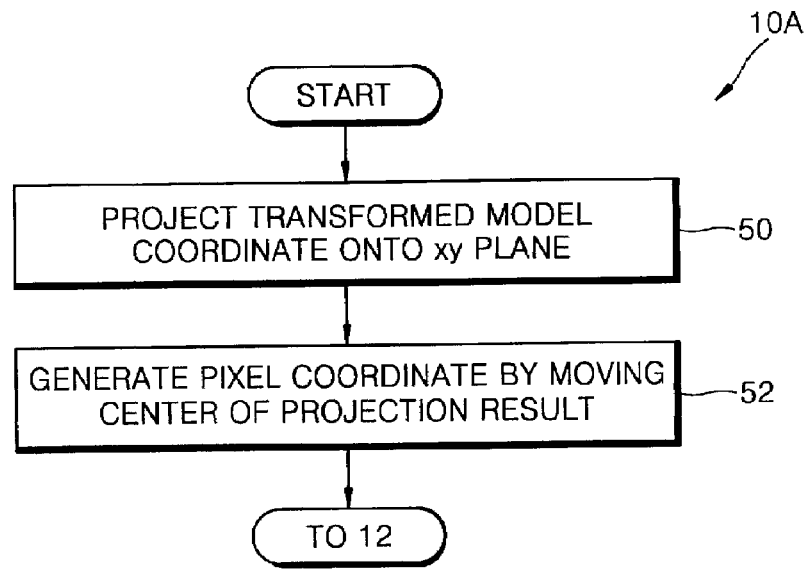
FIG. 4 is a flowchart for explaining step 10 of FIG. 1 according to a first embodiment of the present invention.

FIG. 4 is a flowchart for explaining step 10 of FIG. 1, according to a first embodiment 10A of the present invention, and includes generating pixel coordinates for a frontal or side face image through a projection and movement of a center in steps 50 and 52.

More specifically, the transformed model coordinate for a frontal image is projected to an xy-plane in step 50. After step 50, the center of the projected result is transferred to generate pixel coordinates for the frontal image in step 52 and step 12 of FIG. 1 is performed. In the same manner, transformed model coordinate for a side face image is projected to an xy-plane in step 50. After step 50, the center of the projected result is transferred to generate the pixel coordinates of the side face image in step 52 and step 12 of FIG. 1 is performed.

Figure 5:
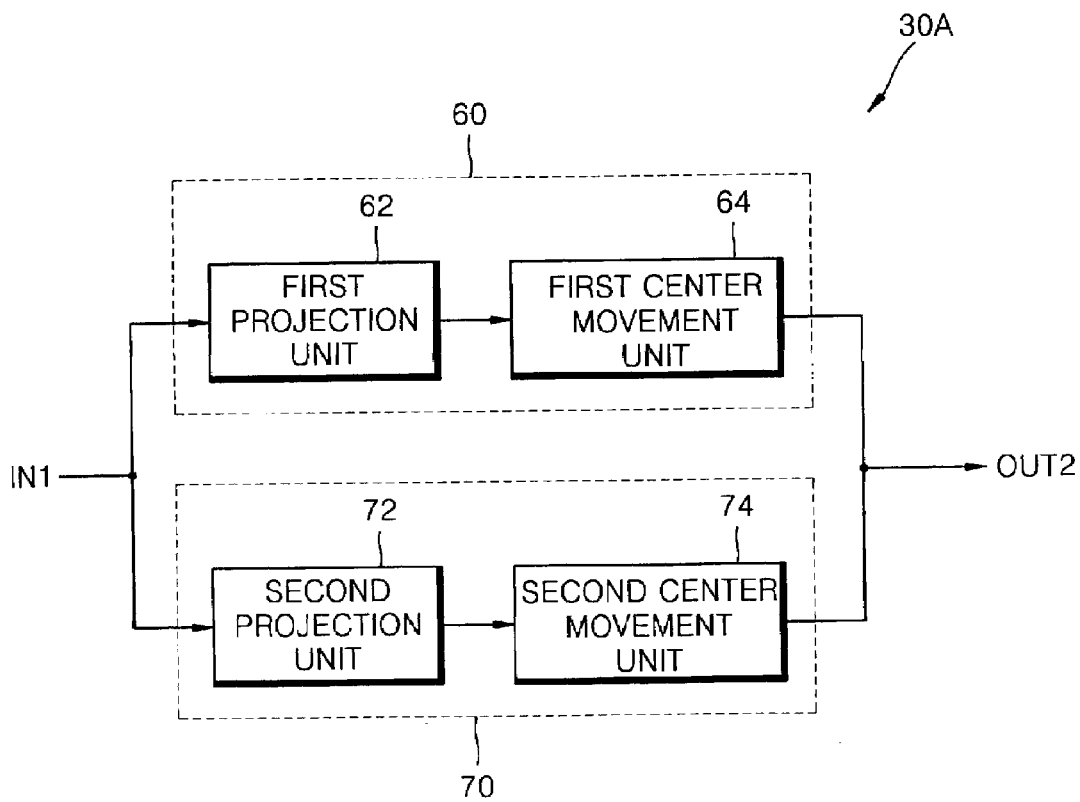
FIG. 5 is a block diagram illustrating a pixel coordinates extraction unit for the method of FIG. 4 according to the first embodiment of the present invention.

FIG. 5 is a block diagram illustrating a pixel coordinates extraction unit 30 for the method 10A of FIG. 4 according to the first embodiment 30A of the present invention and includes first and second coordinates conversion units 60 and 70.

Referring to FIG. 5, a first coordinates conversion unit 60 converts transformed model coordinates of a frontal image input through an input terminal IN1 into pixel coordinate and outputs the converted pixel coordinate to a texture conversion unit 34 through an output terminal OUT2. To this end, a first coordinate conversion unit 60 may include a first projection unit 62 and a first center movement unit 64 to perform the method 10A of FIG. 4. Here, the first projection unit 62 projects the transformed model coordinate of the frontal image input through the input terminal IN1 to an xy-plane and outputs the projection result to the first center movement unit 64. Here, the first center movement unit 64 generates pixel coordinate of the frontal image by moving the center of the projection input from the first projection unit 62 and outputs the pixel coordinate of the generated frontal image to a texture conversion unit 34 through the output terminal OUT2.

A second coordinates conversion unit 70 converts transformed model coordinate of a side face image input through the input terminal IN1 into pixel coordinate and outputs the converted pixel coordinate to the texture conversion unit 34 through the output terminal OUT2. To this end, the second coordinates conversion unit 70 may include a second projection unit 72 and a second center movement unit 74 to perform the method 10A of FIG. 4. Here, the second projection unit 72 projects transformed model coordinate of the side face image input through the input terminal IN1 to an xy-plane and outputs the projection result to the second center movement unit 74. Here, the second center movement unit 74 generates pixel coordinate of the side face image by moving the center of the projection result input from the second projection unit 72 and outputs the generated pixel coordinate of the side face image to the texture conversion unit 34 through the output terminal OUT2.

Figure 6:
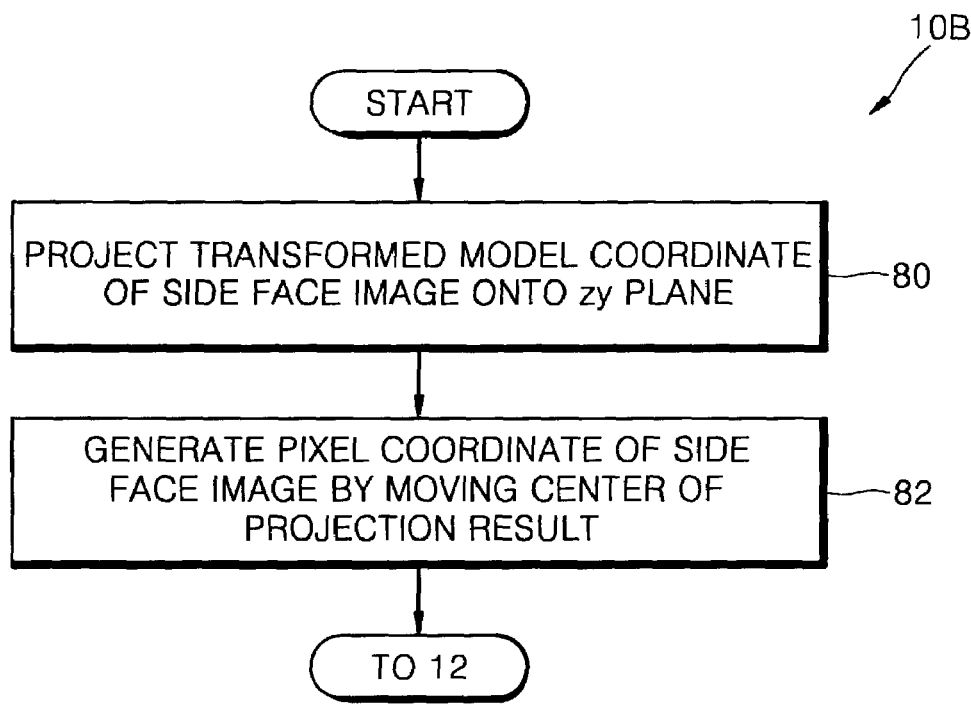
FIG. 6 is a flowchart for explaining step 10 of FIG. 1 according to a second embodiment of the present invention.

FIG. 6 is a flowchart for explaining step 10 of FIG. 1 according to a second embodiment 10B of the present invention, and includes generating pixel coordinate for a side face image through projection and movement of a center in steps 80 and 82.

More specifically, transformed model coordinates of a side face image is projected to an zy-plane in step 80. Thereafter, the center of the projection result is transferred to generate pixel coordinate of the side face image in step 82.

Figure 7:
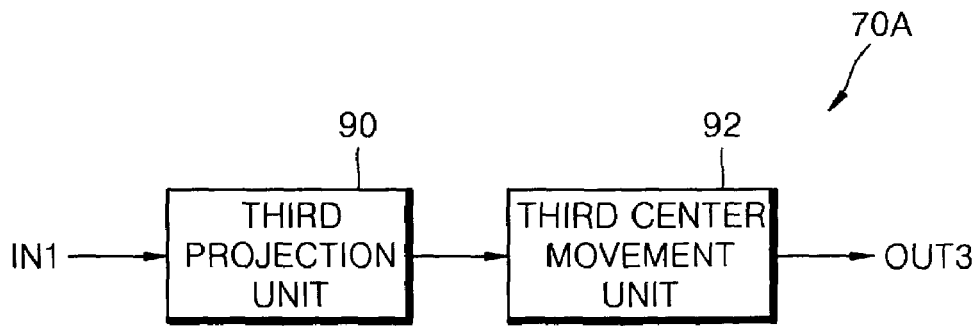
FIG. 7 is a block diagram illustrating a second coordinates conversion unit of FIG. 5 according to the second embodiment of the present invention.

FIG. 7 is a block diagram illustrating a second coordinates conversion unit 70 of FIG. 5 according to the second embodiment 70A of the present invention and includes a third projection unit 90 and a third center movement unit 92.

Referring to FIG. 7, a second coordinates conversion unit 70A may include a third projection unit 90 and a third center movement unit 92 to perform the second embodiment 10B of FIG. 6. Here, the third projection unit 90 projects to the zy plane the transformed model coordinate of a side face image input through an input terminal IN1 and outputs the projection result to the third center movement unit 92. Here, the third center movement unit 92 moves the center of the projection result input from the third projection unit 90 to generate pixel coordinate of the side face image and outputs the generated pixel coordinate to a texture transformation unit 34 through an output terminal OUT3.

In the case where a transformed standard model corresponding to transformed model coordinates is rotated in a right or left direction in correspondence to a right or left face image of side face images, respectively, the second coordinates conversion unit 70 is formed of a second projection unit 72 and a second center movement unit 74. However, in the case where the transformed standard model is not rotated, the second coordinates conversion unit 70 is formed of a third projection unit 90 and a third center movement unit 92.

According to an embodiment of the present invention, first, second, or third center movement unit 64, 74, or 92 rounds coordinates of a result of moving center and outputs the rounded coordinate as pixel coordinate. According to another embodiment of the present invention, first, second, or third center movement unit 64, 74, and 92 terminates the decimals of coordinate of the result of moving center and outputs the termination result as pixel coordinate. Therefore, the pixel coordinate in an integer type can be extracted, according to the two aforementioned embodiments.

Meanwhile, the texture coordinate extraction unit 32 substitutes the transformed model coordinate input through the input terminal IN1 for a conversion function to magnify a predetermined central facial portion at a predetermined rate and reduce a peripheral portion at the predetermined rate. The texture coordinate extraction unit 32 outputs the magnification and reduction results as texture coordinates to a texture transformation unit 34 and a storage unit 36. Step 10 of FIG. 1 and a texture coordinate extraction unit 32 of FIG. 2 according to the embodiments of the present invention will be described with reference to accompanying drawings.

Figure 8:
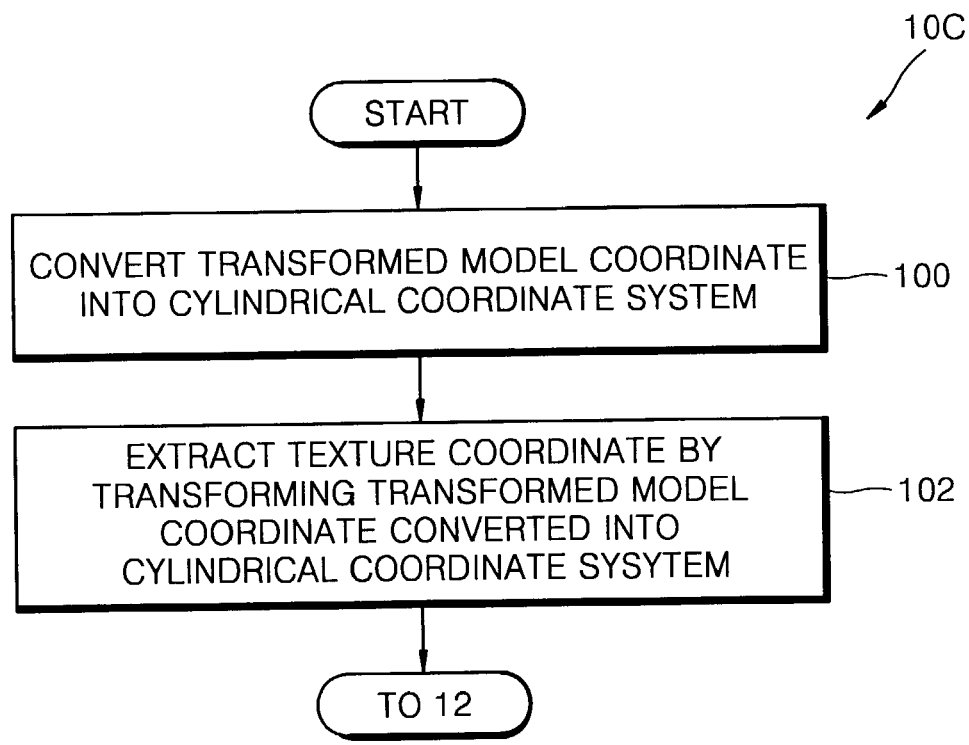
FIG. 8 is a flowchart for explaining step 10 of FIG. 1 according to a third embodiment of the present invention.

FIG. 8 is a flowchart for explaining step 10 of FIG. 1 according to a third embodiment 10C of the present invention and includes converting a coordinate system in step 100 and obtaining texture coordinate by transforming transformed model coordinates, which are represented in the converted coordinate system in step 102.

Figure 9:
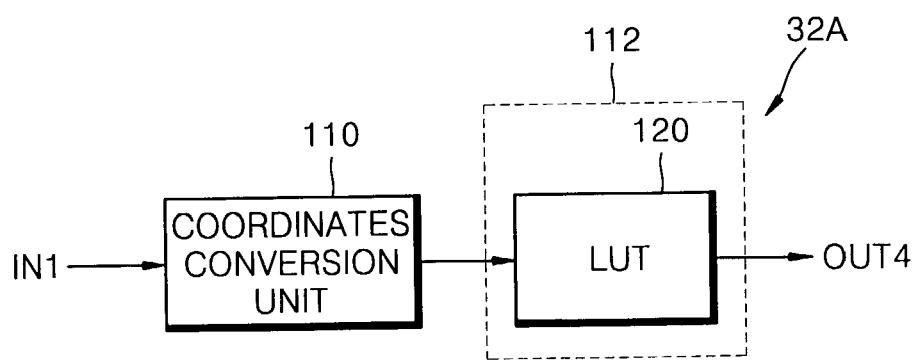
FIG. 9 is a block diagram illustrating a texture coordinates extraction unit for the method of FIG. 8 according to the first embodiment of the present invention.

FIG. 9 is a block diagram illustrating a texture coordinates extraction unit 32 for the method 10C of FIG. 8 according to the first embodiment 32A of the present invention, and includes a coordinate conversion unit 110 and a coordinate transformation unit 112.

A coordinate conversion unit 110 of FIG. 9 converts transformed model coordinate (x, y, z) represented in an orthogonal coordinate system, which are input through an input terminal IN1, into a cylindrical coordinate system (r, θ, $y_c$) as shown in equation 1. In addition, the coordinate conversion unit 110 outputs transformed model coordinates represented in the cylindrical coordinate system to a coordinate transformation unit 112 in step 100.

$$r = \sqrt{x^2 + z^2}$$
$$\theta = \arctan\left(\frac{x}{z}\right)$$
$$y_c = y$$
(1)

Here, the range of θ is from −π to π.

After step 100, the coordinate transformation unit 112 substitutes the transformed model coordinates represented in the cylindrical coordinate system, which is input from the coordinate conversion unit 110, for a conversion function to transform the transformed model coordinates, and then outputs the transformation result as texture coordinate through an output terminal OUT4 in step 102.

Figure 10:
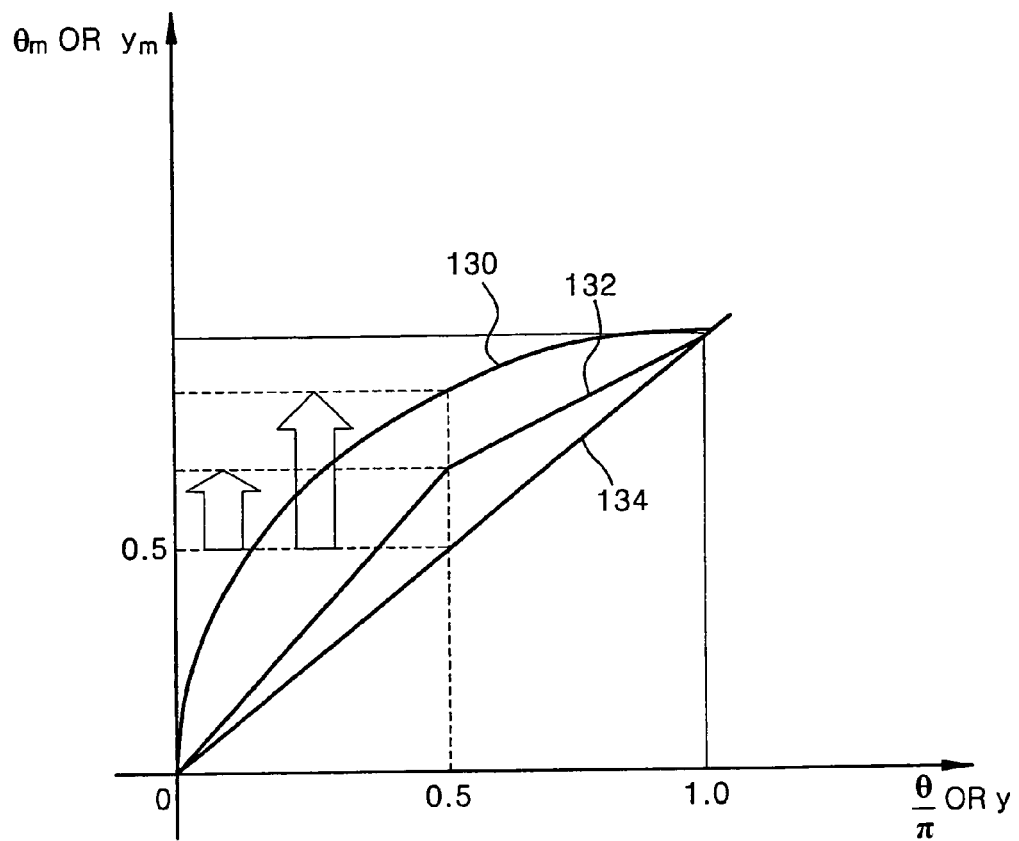
FIG. 10 is a graph for explaining a coordinates transformation unit according to the embodiments of the present invention.

FIG. 10 is a graph for explaining the embodiments of a coordinate transformation unit 112 according to the present invention. Here, a horizontal axis represents transformed model coordinate (θ, y), which are represented in a cylindrical coordinate system, and a vertical axis represents transformed model coordinate transformed by a coordinate transformation unit 112, i.e., texture coordinate ($\theta_m$, $y_m$).

According to the first embodiment of the present invention, the coordinate transformation unit 112 of FIG. 9 transforms the transformed model coordinate represented in the cylindrical coordinate system, input from the coordinate transformation unit 110, by using a transformation function of FIG. 10, i.e., a continuous function 130. Thereafter, the coordinate transformation unit 112 outputs the transformation result through an output terminal OUT4 as texture coordinate. As shown in FIG. 10, in a conventional apparatus for generating textures, transformed model coordinate and texture coordinate correspond to each other by the linear transformation 134. However, an apparatus for generating textures according to the present invention transforms to magnify the transformed model coordinate with a reference to the (0, 0) origin by using continuous functions 130.

For example, the coordinate transformation unit 112 transforms the transformed model coordinate (r, θ, $y_c$), represented as equation 1 in the cylindrical coordinate system, by using a continuous function as in equation 2. In addition, the coordinates transformation unit 112 outputs the transformation result as texture coordinate ($\theta_m$, $y_m$).

$$\theta_m = \frac{\sin\left(\frac{\theta}{2}\right)}{2} + 0.5 \quad (2)$$

$$y_m = \frac{\sin\left(\arctan\left(\frac{y_c}{r}\right)\right)}{2} + 0.5$$

Here, in order to represent the texture coordinate ($\theta_m$, $y_m$) as the transformation result of FIG. 10 in a range from 0.0 to 1.0, the values are divided by 2 and added to 0.5.

In the other example, the coordinate transformation unit 112 transforms the transformed model coordinate (r, $\theta$, $y_c$) represented in equation 1 in the cylindrical coordinate system, by using a tanh continuous function as in equation 3. In addition, the coordinate transformation unit 112 outputs the transformation result as texture coordinate ($\theta_m$, $y_m$) through the output terminal OUT4.

$$\theta_m = \frac{\tanh(\theta)}{2} + 0.5 \quad (3)$$

$$y_m = \frac{\tanh\left[\arctan\left(\frac{y_c}{r}\right) \times 2\right]}{2} + 0.5$$

Here, in order to represent the texture coordinate ($\theta_m$, $y_m$) as the transformation result of FIG. 10 in a range from 0.0 to 1.0, the values are divided by 2 and added to 0.5.

According to the second embodiment of the present invention, a coordinate transformation unit 112 transforms transformed model coordinates represented in a cylindrical coordinate system, which is input from a coordinate conversion unit 110, by using a transformation function of FIG. 10, i.e., a piece-wise linear function 132 to output the transformation result as texture coordinate through an output terminal OUT4. Referring to FIG. 10, the one-to-one correspondence relationship 134 between the transformed model coordinate and the texture coordinate is transformed by a discontinuous piece-wise linear function 132 with reference to the origin (0, 0). For example, the transformed model coordinate (r, $\theta$, $y_c$) represented in the cylindrical coordinate system by equation 1 can be transformed by a piece-wise linear discontinuous function. In this case, $\theta_m$ in the texture coordinate ($\theta_m$, $y_m$) transformed by the piece-wise linear function can be represented in the cylindrical coordinate system as in equation 4.

$$\theta_m = \begin{cases} \frac{0.5\theta}{\pi} - 0.5 & \theta \le -\frac{\pi}{2} \\ \frac{1.5\theta}{\pi} & -\frac{\pi}{2} < \theta < \frac{\pi}{2} \\ \frac{0.5\theta}{\pi} + 0.5 & \frac{\pi}{2} \le \theta \end{cases} \quad (4)$$

According to the third embodiment of the present invention, a coordinate transformation unit 112 can be realized as a predetermined table, for example, a lookup table (LUT) 120. Here, the LUT 120 outputs corresponding texture coordinate for stored texture coordinate ($\theta_m$, $y_m$) through an output terminal OUT4 in response to transformed model coordinate (r, $\theta$, $y_c$), which is represented in a cylindrical coordinate system, input as an address from the coordinate conversion unit 110. For example, when the resolution of a texture is 100×100 pixels, transformed model coordinate having a range from 0.0 to 1.0 is multiplied by 99 so that the range of the transformed model coordinate becomes 0 to 99. Therefore, a desired conversion result, i.e., texture coordinate, can be attained by dividing the values converted via the LUT 120 of Table 1 by 99.

TABLE 1

| transformed model coordinate | 0 | 1 | 2 | 3 | ... | 97 | 98 | 99 |
|---|---|---|---|---|---|---|---|---|
| texture coordinate | 0 | 4 | 7 | 9 | ... | 98 | 99 | 99 |

When the texture coordinate is generated from the transformed model coordinate by using the LUT 120, the variation of texture coordinate can be freely controlled.

Figure 11A:
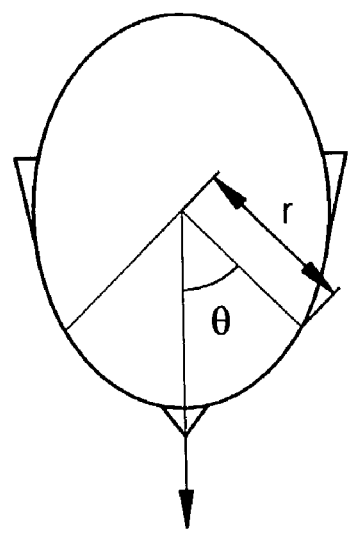
FIGS. 11A and 11B are views schematically illustrating human head.
Figure 11B:
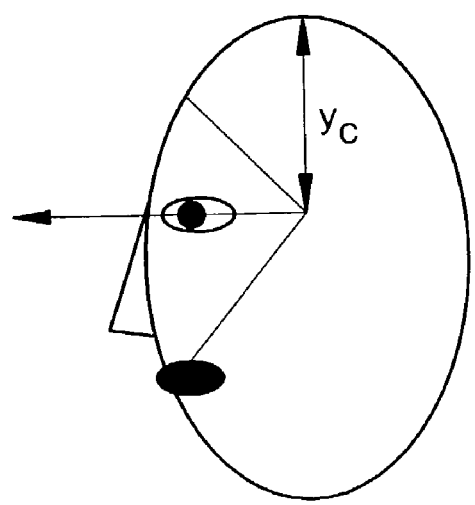

FIGS. 11A and 11B are views schematically illustrating human head, wherein FIG. 11A is a top view of a human head and FIG. 11B is a side view of a human head.

In the top view of the human head of FIG. 11A, a central facial portion is included in a region formed by a 45° span in left and right directions on the basis of the forehead. In the side view of the human head of FIG. 11B, a central facial portion is included in a region formed by a 45° span up and down on the basis of an eye. For example, when a coordinate transformation unit 112 generates texture coordinate by using equation 2 of the first embodiment of the present invention, the horizontal 45° span, i.e., $\theta$ of FIG. 11A, which occupies 25% of the head, is magnified to occupy 38% while the vertical 45° span of FIG. 11B, which occupies 50% of the head, is magnified to occupy 76%. Accordingly, textures in a region occupied by a central facial portion on a face is magnified from 12.5% to 28.9%, more than twice.

The pixel coordinate extraction unit 30 and the texture coordinate extraction unit 32 simultaneously extract pixel coordinate and texture coordinate. For example, while the first or second embodiment 10A or 10B of FIG. 4 or 6 generates the pixel coordinates for the frontal and side face images, the third embodiment 10C of FIG. 8 generates the texture coordinates for the frontal and side face images.

After step 10, the frontal and side face images, which are received from the user in response to the analysis result of the transformed model coordinate, are interpolated by using the texture coordinate in the unit a polygon unit in order to decide the interpolation result as transformed texture in step 12. To this end, the texture transformation unit 34 analyzes the transformed model coordinate input through the input terminal IN1 and receives the frontal or side face image through an input terminal IN2 in response to the analysis result. In addition, the texture transformation unit 34 interpolates the frontal or side face image by using the texture coordinates received from the texture coordinates extraction unit 32 in the unit of polygon to output the interpolation result as transformed texture. Here, the texture transformation unit 34 extracts polygon of the frontal or side face image by using the pixel coordinate input from the pixel coordinates extraction unit 30. The frontal or side face image input through the input terminal IN2 may be provided from a user by using a video camcorder, a digital camera, a scanner, or an image file.

Step 12 of FIG. 1 and a texture transformation unit 34 of FIG. 2 according to the embodiments of the present invention will be described with reference to accompanying drawings.

Figure 12:
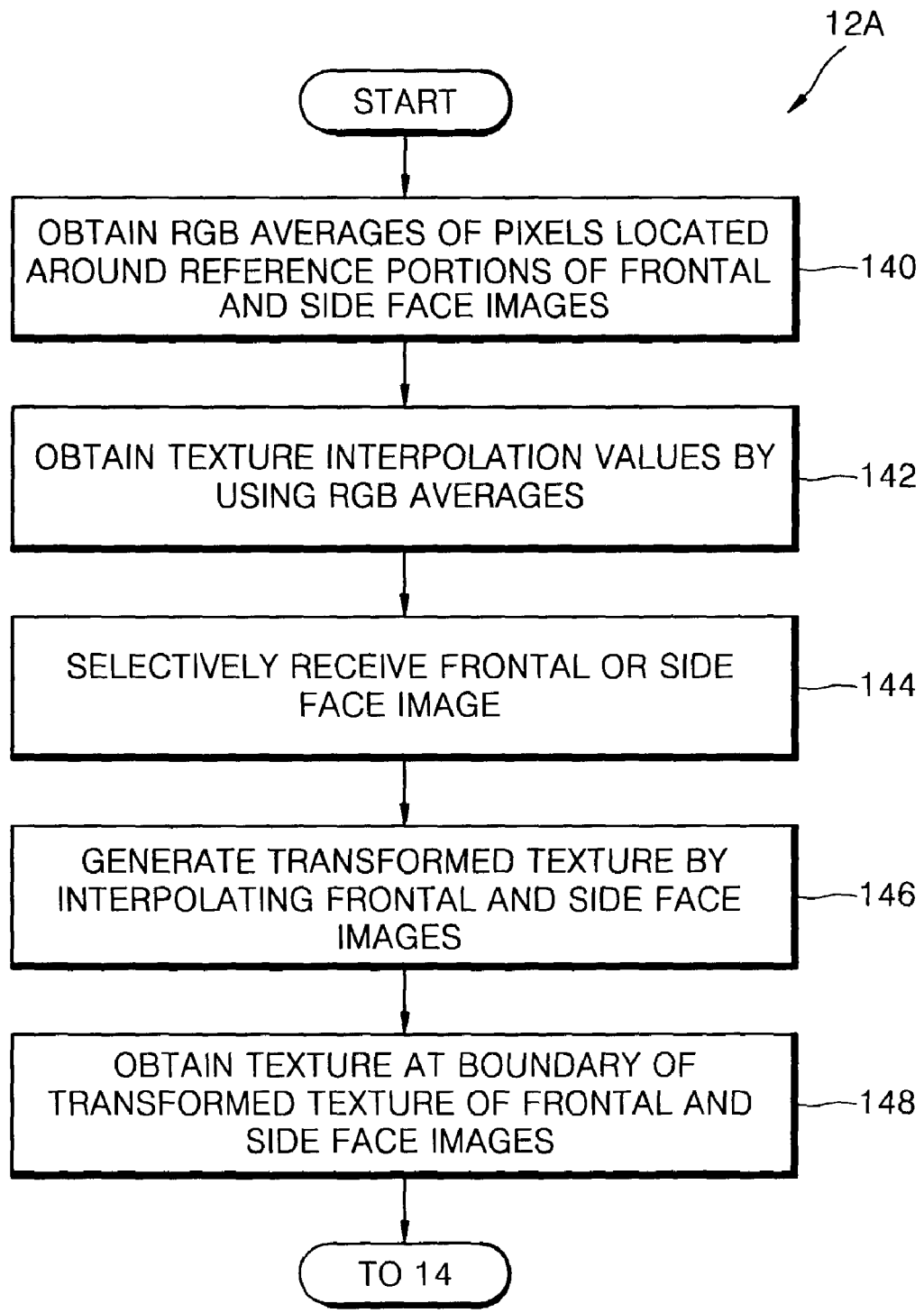
FIG. 12 is a flowchart for explaining step 12 of FIG. 1 according to the first embodiment of the present invention.

FIG. 12 is a flowchart for explaining step 12 of FIG. 1 according to the first embodiment 12A of the present invention and includes obtaining texture interpolation values by using frontal and side face images in steps 140 and 142 and obtaining the transformed textures of the frontal and side face images in steps 144 through 148.

Figure 13:
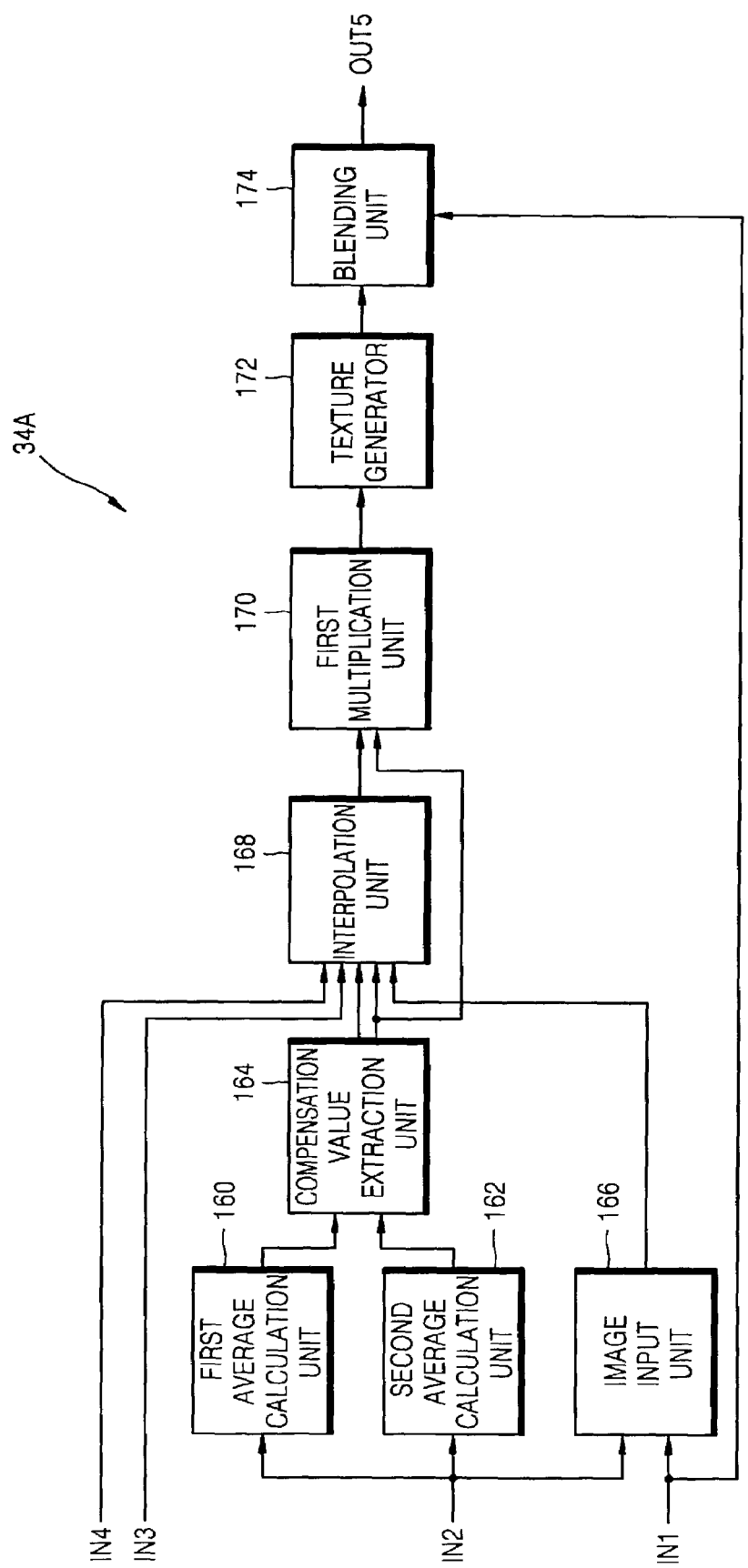
FIG. 13 is a block diagram illustrating a texture transformation unit for the method of FIG. 12 according to the first embodiment of the present invention.

FIG. 13 is a block diagram illustrating a texture transformation unit 34A for the method 12A of FIG. 12, according to the first embodiment of the present invention, that includes first and second average calculation units 160 and 162, a compensation value extraction unit 164, an image input unit 166, an interpolation unit 168, a first multiplication unit 170, a texture generator 172, and a blending unit 174.

After step 10, RGB averages of pixels located at the peripherals of reference portions of a frontal image and a side face image given from a user are obtained as first and second averages, respectively, in step 140. In order to perform step 140, a texture transformation unit 34A includes first and second average calculation units 160 and 162. Here, the first average calculation unit 160 calculates the first averages ($\Delta R$, $\Delta G$, $\Delta B$) that are the RGB averages of the pixels located at the peripheral of the reference portion of the frontal image input from the user through an input terminal IN2 to output the first averages to a compensation value extraction unit 164. The second average calculation unit 162 calculates the second averages that are the RGB averages of the pixels located at the peripheral of the reference portion of the side face image input from the user through the input terminal IN2 to output the second averages to the compensation value extraction unit 164.

According to the present invention, at least one selected from the first and second average calculation units 160 and 162 decides the first or second average, which exceeds a predetermined value, as the predetermined value. This is due to the prevention of errors induced by the first or second average exceeding the predetermined value, even though the first or second average rarely exceeds the predetermined value since human skins are not in primary colors.

After step 140, the compensation value extraction unit 164 calculates average ratios between the first and second averages input from the first and second average calculation units 160 and 162, respectively, and outputs the average ratios as texture interpolation values in step 142.

For example, the configurations and operations of the second average calculation unit 162 and the compensation value extraction unit 164 on the assumption that two side face images, namely, right and left face images, are input through the input terminal IN2 will now be described.

Figure 14:
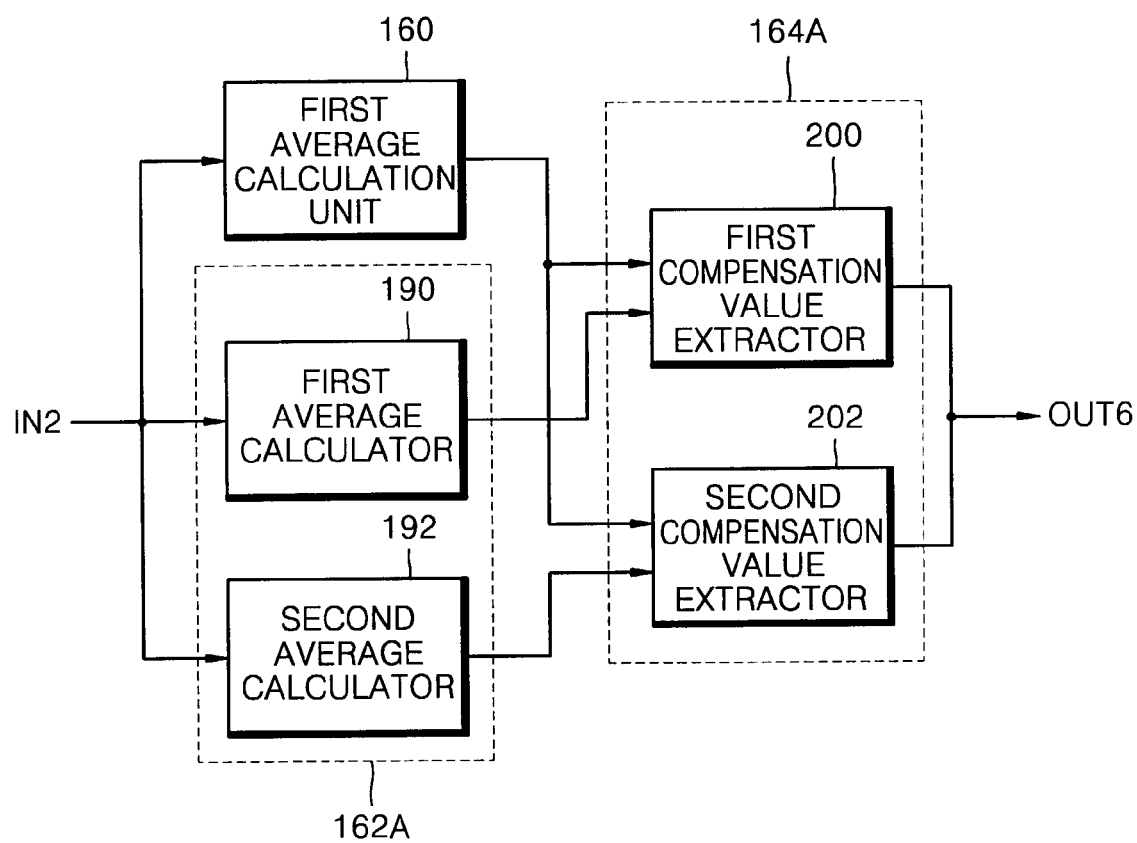
FIG. 14 is a block diagram illustrating a second average calculation unit and a compensation value extraction unit of FIG. 13 according to the embodiments of the present invention.

FIG. 14 is a block diagram illustrating the second average calculation unit 162 and the compensation value extraction unit 164 of FIG. 13 according to the embodiments 162A and 164A of the present invention, and includes a first average calculation unit 160, a second average calculation unit 162A, and a compensation value extraction unit 164A.

On the above assumption, a second average calculation unit 162A is formed of first and second average calculators 190 and 192, and a compensation value extraction unit 164A is formed of first and second compensation value extractors 200 and 202. The first average calculator 190 calculates second averages ($\Delta R'$, $\Delta G'$, $\Delta B'$) that are RGB averages of the pixels located in the peripheral of a reference portion of a right image, which is one of side face images input from a user through an input terminal IN2. Then, the first average calculator 190 outputs the calculated second averages ($\Delta R'$, $\Delta G'$, $\Delta B'$) to the compensation value extraction unit 164A. The second average calculator 192 calculates second averages ($\Delta R''$, $\Delta G''$, $\Delta B''$) that are RGB averages of the pixels located in the peripheral of a reference portion of a left image, which is the other of the side face images input from the user through the input terminal IN2. Then, the second average calculator 192 outputs the second calculated averages ($\Delta R''$, $\Delta G''$, $\Delta B''$) to the compensation value extraction unit 164A. Since the effects of lighting are outstanding in the left and right sides of a face, the first and second average calculators 190 and 192 may calculate the averages independently.

Here, the first compensation value extractor 200 of the compensation value extraction unit 164A calculates average ratios RR, RG, and RB between the first averages ($\Delta R$, $\Delta G$, $\Delta B$) input from the first average calculation unit 160 and the second averages ($\Delta R'$, $\Delta G'$, $\Delta B'$) input from the first average calculator 190 by using equation 5. Thereafter, the first compensation value extractor 200 outputs the calculated average ratios RR, RG, and RB as texture interpolation values through an output terminal OUT6.

$$RR = \frac{\Delta R}{\Delta R'}, \quad RG = \frac{\Delta G}{\Delta G'}, \quad RB = \frac{\Delta B}{\Delta B'} \tag{5}$$

The second compensation value extractor 202 calculates average ratios LR, LG, and LB between the first averages ($\Delta R$, $\Delta G$, $\Delta B$) from the first average calculation unit 160 and the second averages ($\Delta R''$, $\Delta G''$, $\Delta B''$) from the second average calculator 192 by using equation 6. Thereafter, the second compensation value extractor 202 outputs the calculated average ratios LR, LG, and LB as texture interpolation values through the output terminal OUT6.

$$LR = \frac{\Delta R}{\Delta R''}, \quad LG = \frac{\Delta G}{\Delta G''}, \quad LB = \frac{\Delta B}{\Delta B''} \tag{6}$$

According to the present invention, unlike the above assumption, if only one side face image, i.e., only right or left side image, is input through an input terminal IN2, the other side face image can be attained by copying the input side image by a mirror symmetry method. Accordingly, even if only one side face image is input through the input terminal IN2, the second average calculation unit 162 and the compensation value extraction unit 164 operate as the description with reference to FIG. 14. To this end, the second average calculation unit 162 includes a separate image copy unit (not shown). Here, the image copy unit mirror-copies the side face image input through the input terminal IN2 to determine the mirror-copied image as the other side face image which has not input. Although the other side face image is determined by mirror-copying the input side face image, the texture is compensated for with reference to the RGB, i.e., bright distribution, of a frontal image so that the quality of the texture does not deteriorate.

According to the present invention, the first or second averages obtained in the first average calculation unit 160 and the second average calculation unit 162 or 162A correspond to arithmetic averages or median averages.

The functions of steps 140 and 142 of FIG. 12 and the reference portion will now be described.

The frontal image and the side face images input through the input terminal IN2 generally have different lightings and different brightness so that it is difficult to compensate for the lightings. However, if the texture is generated by a subsequent method using texture interpolation values obtained by performing steps 140 and 142, the-brightness difference between the frontal image and the side face images can be compensated for. To this end, a reference portion has to be properly established. In the present invention, a predetermined portion of a face having textures slightly different from the textures of the frontal image and the side face image, for example, a cheek, can be established as a reference portion. Since the cheek portion slowly slants, the difference between the textures of the cheeks in the frontal image and the side face image is small. In other words, the direction of a normal vector at a cheek portion is inclined by about 45° with respect to the front of the side of the face. Accordingly, when the light directions are not greatly deviated, the cheek portions having similar reflectivity in the frontal and side images have a small difference in textures. As describe above, errors due to noise image or skin spots can be reduced by establishing the cheek portion as a reference portion.

In addition, a user can vary the regions in which the pixels used in calculating the first or second averages by the first or second average calculation units 160 or 162 are located. For example, if the size of the frontal or side face image is 512×512 pixels and a face occupies about 25% of the image, the pixels located in a circle having a diameter of five pixels can be used to calculate the first or second averages.

After step 142, the image input unit 166 analyzes the transformed model coordinate input through the input terminal IN1, selectively receives the frontal image or the side face image from the user through the input terminal IN2 in response to the analysis result, and then outputs the received frontal image or side face image to the interpolation unit 168 in step 144. In other words, the image input unit 166 decides whether an image to be interpolated in the interpolation unit 168 is a frontal image or a side face image. To this end, the image input unit 166 analyzes the transformed model coordinate input through the input terminal IN1.

After step 144, the frontal and side face images are interpolated by using the texture coordinate and texture interpolation values in the unit of polygon, which is decided by the pixel coordinate, so that the transformed texture is generated using the interpolation result in step 146.

In the first embodiment of the present invention, the texture transformation unit 34A may include an interpolation unit 168, a first multiplication unit 170, and a texture generator 172 to perform step 146. In this case, the interpolation unit 168 interpolates a frontal or side face image input from an image input unit 166 by using texture coordinate input from a texture coordinate extraction unit 32 through an input terminal IN4 and texture interpolation values input from a compensation value extraction unit 164, in the unit of polygon. Here, the polygon is decided by the pixel coordinate input from a pixel coordinate extraction unit 30 through an input terminal IN3. Thereafter, the interpolation unit 168 outputs the interpolation result to the first multiplication unit 170. Here, the first multiplication unit 170 multiplies the interpolation result input from the interpolation unit 168 by the texture interpolation values input from the compensation value extraction unit 164 to output the multiplication result to the texture generator 172. The texture generator 172 generates transformed texture by using the multiplication result input from the first multiplication unit 170 to output the transformed texture to the blending unit 174.

Here, as shown in FIG. 13, the first multiplication unit 170 may be arranged after the compensation value extraction unit 164 instead of the interpolation unit 168. In this case, the configuration and operation of the texture transformation unit 34 of FIG. 2 according to the other embodiment of the present invention will be described with reference to the accompanying drawings.

FIG. 15 is a block diagram illustrating a texture transformation unit 34B for the method 12A of FIG. 12 according to the second embodiment of the present invention, and includes first and second average calculation units 160 and 162, a compensation value extraction unit 164, an image input unit 166, a second multiplication unit 210, an interpolation unit 212, a texture generator 214, and a blending unit 216.

According to the second embodiment of the present invention, the texture transformation unit 34B may include a second multiplication unit 210, an interpolation unit 212, and a texture generator 214 to perform step 146. In this case, the second multiplication unit 210 multiplies a frontal or side face image input from an image input unit 166 by texture interpolation values from the compensation value extraction unit 164 to output the multiplication result to the interpolation unit 212. Here, the interpolation unit 212 interpolates the multiplication result from the second multiplication unit 210 by using texture coordinate input from the texture coordinate extraction unit 32 through an input terminal IN4, in the unit of polygon, decided by pixel coordinate input from a pixel coordinate extraction unit 30 through an input terminal IN3. Thereafter, the interpolation unit 212 outputs the interpolation result to the texture generator 214. Here, the texture generator 214 generates transformed texture by using the interpolation result input from the interpolation unit 212 to output the transformed texture to a blending unit 216.

As a result, an interpolation unit 168 or 212 interpolates the textures of frontal and side face images input via an image input unit 166 to copy the textures to a texture buffer (not shown). Here, the texture buffer that temporarily stores copied textures can be embedded in the interpolation unit 168 or 212. In addition, the interpolations by the interpolation unit 168 or 212 can mean linear interpolations. For example, in the case where a triangular polygon is used, the interpolation unit 168 or 212 obtains a vector that determines two sides out of three points of the polygon and copies the texture in the frontal and side face images to the texture buffer by performing a linear interpolation using the obtained vector. Here, a texture generator 172 or 214 receives the multiplication or interpolation result from a first multiplication unit 170 or the interpolation unit 212 to generate one piece of transformed texture by using the multiplication or interpolation results for overall polygons.

Meanwhile, in the third embodiment of the present invention, unlike in FIG. 13 or 15, the texture transformation unit 34A or 34B may not include first and second average calculation units 160 and 162 and a compensation value extraction unit 164. In this case, the interpolation unit 168 of FIG. 13 interpolates a frontal or side face image by using only texture coordinate in the unit of polygon while the texture transformation unit 34A does not include a first multiplication unit 170. Accordingly, a texture generator 172 generates transformed texture by using the interpolation result input from an interpolation unit 168 instead of the multiplication result input from the first multiplication unit 170. In addition, an interpolation unit 212 of FIG. 15 interpolates a frontal or side face image by using only texture coordinate in the unit of polygon while the texture transformation unit 34B does not include a second multiplication unit 210. Accordingly, the interpolation unit 212 interpolates the frontal or side face image input from an image input unit 166 by using only texture coordinate in the unit of polygon instead of the multiplication result from the second multiplication unit 210.

After step 146, the blending unit 174 or 216 generates transformed texture for a boundary between the transformed textures, for the frontal image and the side face image input from the texture generator 172 or 214 by mixing the transformed textures from the both sides of the boundary. In addition, the transformed texture is processed for being kept originally transformed texture as the textures are distanced from the boundary. The transformed textures for the boundary, frontal image, and side images are output through an output terminal OUT5 or OUT7. To this end, the blending unit 174 or 216 calculates averages of the transformed textures at both sides of the boundary and decides the calculated averages as the transformed texture for the boundary. Accordingly, the blending unit 174 or 216 cancels the unnaturalness that occurs at portions connecting the frontal image and the side face images.

After step 12, the storage unit 36 stores at least one of the transformed texture input from the texture transformation unit 34, the texture coordinate input from the texture coordinate extraction unit 32, and the transformed model coordinate input through the input terminal IN1 to output the stored texture and/or coordinate through an output terminal OUT1 in step 14. Here, the transformed texture, texture coordinate, and transformed model coordinate can be used for generating animations or still images or used in mobile devices. To this end, the storage unit 36 stores the texture and/or coordinate in a format designated by the user.

Figure 16A:
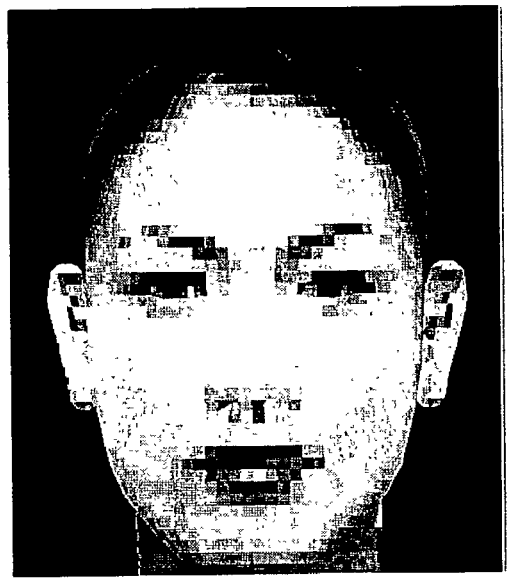
FIGS. 16A and 16B are views for comparing a conventional method for generating textures with a method for generating textures according to the present invention.
Figure 16B:

FIGS. 16A and 16B are views for comparing a conventional method for generating textures with a method for generating textures according to the present invention. Here, FIG. 16A is a 2D image of a 3D image generated by the conventional method for generating textures. FIG. 16B is a 2D image of a 3D image generated by a method for generating textures according to the present invention.

In the case where the texture having the same size is put on a 3D standard model, the facial image generated by the conventional method using a cylindrical coordinate system has a blurred central facial portion as shown in FIG. 16A. However, the facial image generated by the method according to the present invention that magnifies the central facial portion has a clear central facial portion as shown in FIG. 16B. Accordingly, the image of FIG. 16B is clearer than the image of FIG. 16A.

As described above, a method and an apparatus for generating textures for a 3D facial model according to the present invention do not compress texture so that the method and the apparatus do not require a compression unit and a recovery unit in software and hardware manners. Since the method and the apparatus according to the present invention generate transformed texture by using texture interpolation values, excellent texture can be generated by using a frontal image and side face images that are photographed under different lighting conditions, and the method and the apparatus according to the present invention can naturally process boundaries between polygons. In addition, the texture region for a portion on which users is interested, i.e., a central facial portion, is expanded by using the texture region for the peripheral portion on which a user is not interested so that excellent texture can be generated by using a limited amount of resources in comparison with the conventional method. As a result, a clear 3D facial model can be generated.

What is claimed is:

1. A method for generating textures for a three dimensional (3D) facial model, the method comprising:
   (a) extracting texture coordinates from a magnification result of a predetermined central facial portion magnified by a predetermined rate and a reduction result of a peripheral portion reduced by the predetermined rate of the magnification, by converting transformed model coordinates into pixel coordinates, the transformed model coordinates being generated by transforming a standard model for a frontal face image and at least one side face image according to a conversion function; and
   (b) interpolating the frontal and side face images, which are received from a user in response to the transformed model coordinates, by using the texture coordinates in units, the polygon being decided by the pixel coordinates, to obtain transformed texture,
   wherein the central facial portion includes a region established by the user centering upon the eyes of the face and the peripheral portion includes a region of the face except for the central facial portion of the face.

2. The method for generating textures for a 3D facial model of claim 1, further comprising storing at least one of the transformed texture, the texture coordinates, and the transformed model coordinates after step (b).

3. The method for generating textures for a 3D facial model of claim 1, wherein step (a) comprises:
   (a1) projecting the transformed model coordinates for the frontal or side face image onto an xy plane; and
   (a2) generating the pixel coordinates for the frontal or side face image by moving a center of the projection.

4. The method for generating textures for a 3D facial model of claim 1, wherein step (a) comprises:
   (a3) projecting the transformed model coordinates for the side face image onto a zy plane; and
   (a4) generating the pixel coordinates for the side face image by moving a center of the projection.

5. The method for generating textures for a 3D facial model of claim 1, wherein step (b) comprises:
   (b1) selectively receiving the frontal or side face image according to the transformed model coordinates; and
   (b2) interpolating the selectively received frontal or side face image by using the texture coordinates in the polygon units to generate the transformed texture.

6. The method for generating textures for a 3D facial model of claim 5, wherein step (b) further comprises:
   (b3) obtaining first averages that are red, green, blue (RGB) averages of pixels located around a reference portion of the frontal face image received from the user and second averages that are RGB averages of pixels located around the reference portion of the side face image received from the user; and
   (b4) obtaining as texture interpolation values average ratios between the first averages and the second averages and proceeding to step (b1),
   wherein the reference portion corresponds to a predetermined portion on the face having similar textures for the frontal face image and the side face image, and wherein the texture interpolation values are used in interpolating the frontal or side face image in step (b2).

7. The method for generating textures for a 3D facial model of claim 6, wherein the reference portion corresponds to a cheek of the face.

8. The method for generating textures for a 3D facial model of claim 6, wherein the first averages and the second averages are arithmetic averages, respectively.

9. The method for generating textures for a 3D facial model of claim 6, wherein the first averages and the second averages are median averages, respectively.

10. The method for generating textures for a 3D facial model of claim 6, wherein the first averages and the second averages are compared to a predetermined value to detect errors.

11. The method for generating textures for a 3D facial model of claim 6, wherein step (b) further comprises:
(b5) after step (b2), multiplying the interpolation result by the texture interpolation values to generate the transformed texture.

12. The method for generating textures for a 3D facial model of claim 6, wherein step (b) further comprises:
(b6) after step (b1), multiplying the selectively received frontal or side face image by the texture interpolation values and proceeding to step (b2), wherein in step (b2), the multiplication result of step (b6) is interpolated by using the texture coordinates in the polygon units to generate the transformed texture.

13. The method for generating textures for a 3D facial model of claim 6, wherein step (b) further comprises, after step (b2), generating transformed texture for a boundary region between the transformed texture of the frontal face image and the transformed texture of the side face image by mixing the frontal and side face image transformed textures at the boundary region.

14. The method for generating textures for a 3D facial model of claim 1, wherein step (a) further comprises:
(a5) converting the transformed model coordinates from an orthogonal coordinate system into a cylindrical coordinate system; and
(a6) extracting the texture coordinates by transforming the converted transformed model coordinates that are represented in the cylindrical coordinate system.

15. The method for generating textures for a 3D facial model of claim 14, wherein step (a6) comprises transforming the converted transformed model coordinates represented in the cylindrical coordinate system by using a continuous function to extract the texture coordinates.

16. The method for generating textures for a 3D facial model of claim 15, wherein the transformed model coordinates $(r, \theta, y_c)$ represented in the cylinder coordinate system are converted by using continuous functions $\theta_m$ and $y_m$, $$\theta_m = \frac{\sin\left(\frac{\theta}{2}\right)}{2} + 0.5, \quad y_m = \frac{\sin\left(\arctan\left(\frac{y_c}{r}\right)\right)}{2} + 0.5,$$

wherein $\theta_m$ and $y_m$ denote the texture coordinates.

17. The method for generating textures for a 3D facial model of claim 15, wherein the transformed model coordinates $(r, \theta, y_c)$ represented in the cylindrical coordinate to system is are converted by using continuous functions $\theta_m$ and $y_m$, $$\theta_m = \frac{\tanh(\theta)}{2} + 0.5, \quad y_m = \frac{\tanh\left[\arctan\left(\frac{y_c}{r}\right) \times 2\right]}{2} + 0.5,$$

wherein $\theta_m$ and $y_m$ denote the texture coordinates.

18. The method for generating textures for a 3D facial model of claim 14, wherein step (a6) comprises transforming the converted transformed model coordinates represented in the cylindrical coordinate system by using a piece-wise linear function to extract the texture coordinates.

19. The method for generating textures for a 3D facial model of claim 14, wherein step (a6) comprises transforming the converted transformed model coordinates represented in the cylindrical coordinate system by using a predetermined table to extract the corresponding texture coordinates.

20. An apparatus for generating textures for a 3D facial model, the apparatus comprising:
a texture coordinate extraction unit for inputting transformed model coordinates generated by transforming a standard model for a frontal face image and at least one side face image of a face, magnifying a predetermined central facial portion by a predetermined rate and reducing a peripheral facial portion by the predetermined rate of the magnification by substituting the transformed model coordinates into a conversion function, and outputting the magnification and reduction results as texture coordinates;
a pixel coordinate extraction unit for converting the transformed model coordinates into pixel coordinates to output the converted pixel coordinates; and
a texture transformation unit for analyzing the transformed model coordinates, receiving the frontal or side face image from a user in response to the analysis result of the transformed model coordinates, interpolating the frontal or side face image by using the texture coordinates in polygon units, the polygon being decided by the pixel coordinates, and outputting an interpolation result as transformed texture,
wherein the central facial portion includes a region established by a user centering upon the eyes of the face and the peripheral portion includes a region of the face except for the central facial portion of the face.

21. The apparatus for generating textures for a 3D facial model of claim 20, further comprising a storage unit for storing at least one of the transformed texture input from the texture transformation unit, the texture coordinates input from the texture coordinate extraction unit, and the transformed model coordinates.

22. The apparatus for generating textures for a 3D facial model of claim 20, wherein the pixel coordinate extraction unit comprises:
a first coordinate conversion unit for converting the transformed model coordinates for the frontal face image into the pixel coordinates to output the converted pixel coordinates to the texture transformation unit; and
a second coordinate conversion unit for converting the transformed model coordinates for the side face image into the pixel coordinates to output the converted pixel coordinates to the texture transformation unit.

23. The apparatus for generating textures for a 3D facial model of claim 22, wherein the first coordinate conversion unit comprises:
a first projection unit for projecting the transformed model coordinates of the frontal face image onto an xy plane to output a projection result; and
a first center movement unit for generating the pixel coordinates for the frontal face image by moving a center of the projection result input from the first projection unit to output the generated pixel coordinates of the frontal face image to the texture transformation unit.

24. The apparatus for generating textures for a 3D facial model of claim 22, wherein the second coordinate conversion unit comprises:
 a second projection unit for projecting the transformed model coordinates of the side face image onto an xy plane to output a projection result; and
 a second center movement unit for generating the pixel coordinates for the side face image by moving a center of the projection result input from the second projection unit to output the generated pixel coordinates of the side face image to the texture transformation unit.

25. The apparatus for generating textures for a 3D facial model of claim 22, wherein the second coordinate conversion unit comprises:
 a third projection unit for projecting the transformed model coordinates for the side face image onto an zy plane to output a projection result; and
 a third center movement unit for generating the pixel coordinates for the side face image by moving a center of the projection result input from the third projection unit to output the generated pixel coordinates of the side face image to the texture transformation unit.

26. The apparatus for generating textures for a 3D facial model of claim 20, wherein the texture transformation unit comprises:
 an image input unit for analyzing the transformed model coordinates to selectively receive the frontal or side face image from the user in response to the result of the analysis of the transformed model coordinates;
 an interpolation unit for interpolating the frontal or side face image input from the image input unit by using the texture coordinates in the polygon units, the polygon decided by the pixel coordinates, to output the interpolation result; and
 a texture generator for generating the transformed texture by using the interpolation result input from the interpolation unit to output the generated transformed texture.

27. The apparatus for generating textures for a 3D facial model of claim 26, wherein the texture transformation unit further comprises:
 a first average calculation unit for calculating first averages that are red, green, blue (RGB) averages for pixels located around a reference portion of the frontal face image input by the user;
 a second average calculation unit for calculating second averages that are RGB averages for pixels located around the reference portion of the side face image input by the user; and
 a compensation value extraction unit for calculating average ratios between the first averages and the second averages to output the calculated average ratios as texture interpolation values,
 wherein the reference portion corresponds to a predetermined portion on the face, having similar textures between the frontal face image and the side face image, and wherein the interpolation unit uses the texture interpolation values in interpolating the frontal or side face image.

28. The apparatus for generating textures for a 3D facial model of claim 27, wherein the first and second average calculation units compare the first average and the second average, respectively, to a predetermined value to detect errors.

29. The apparatus for generating textures for a 3D facial model of claim 27, wherein the second average calculation unit comprises:
 a first average calculator for calculating second averages that are RGB averages of pixels located around the reference portion of a right face image input from the user and outputting the calculated second averages for the right face image to the compensation value extraction unit; and
 a second average calculator for calculating second averages that are RGB averages of pixels located around the reference portion of a left face image input from the user and outputting the calculated second averages for the left face image to the compensation value extraction unit.

30. The apparatus for generating textures for a 3D facial model of claim 29, wherein the compensation extraction unit comprises:
 a first compensation value extractor for calculating the average ratios between the first averages input from the first average calculation unit and the second averages input from the first average calculator of the second average calculation unit to output the calculated average ratios as the texture interpolation values; and
 a second compensation value extractor for calculating the average ratios between the first averages input from the first average calculation unit and the second averages input from the second average calculator of the second average calculation unit to output the calculated average ratios as the texture interpolation values.

31. The apparatus for generating textures for a 3D facial model of claim 27, wherein the texture transformation unit further comprises:
 a first multiplication unit for multiplying the interpolation result input from the interpolation unit by the texture interpolation values input from the compensation value extraction unit to output a multiplication result to the texture generator,
 wherein the texture generator generates the transformed texture by using the multiplication result input from the first multiplication unit.

32. The apparatus for generating textures for a 3D facial model of claim 27, wherein the texture transformation unit further comprises:
 a second multiplication unit for multiplying the frontal or side face image input from the image input unit by the texture interpolation values input from the interpolation value extraction unit to output a multiplication result to the interpolation unit,
 wherein the interpolation unit interpolates the multiplication result input from the second multiplication unit by using the texture coordinates in the polygon units.

33. The apparatus for generating textures for a 3D facial model of claim 27, wherein the texture transformation unit further comprises a blending unit for generating the transformed texture for a boundary region between the transformed texture of the frontal face image input from the texture generator and the transformed texture of the side face image input from the texture generator by mixing the frontal and side face image transformed textures at the boundary region.

34. The apparatus for generating textures for a 3D facial model of claim 20, wherein the texture coordinate generation unit comprises:
 a coordinate conversion unit for converting the transformed model coordinates from an orthogonal coordinate system into a cylindrical coordinate system and outputting converted transformed model coordinates; and a coordinate transformation unit for transforming the converted transformed model coordinates input from the coordinate conversion unit to output the transformation result as the texture coordinates.

35. The apparatus for generating textures for a 3D facial model of claim 34, wherein the coordinate transformation unit transforms the transformed model coordinates input from the coordinate conversion unit by using a continuous function and outputs the transformation result as the texture coordinates.

36. The apparatus for generating textures for a 3D facial model of claim 35, wherein the coordinate transformation unit transforms the transformed model coordinates (r, θ, $y_c$) input from the coordinate conversion unit by using continuous functions $\theta_m$ and $y_m$, $$\theta_m = \frac{\sin\left(\frac{\theta}{2}\right)}{2} + 0.5, \quad y_m = \frac{\sin\left(\arctan\left(\frac{y_c}{r}\right)\right)}{2} + 0.5,$$

wherein $\theta_m$ and $y_m$ denote the texture coordinates.

37. The apparatus for generating textures for a 3D facial model of claim 35, wherein the coordinates transformation unit transforms the transformed model coordinates (r, θ, $y_c$) input from the coordinate conversion unit by using continuous functions $\theta_m$ and $y_m$, $$\theta_m = \frac{\tanh(\theta)}{2} + 0.5, \quad y_m = \frac{\tanh\left[\arctan\left(\frac{y_c}{r}\right) \times 2\right]}{2} + 0.5$$

wherein θm and ym denote the texture coordinates.

38. The apparatus for generating textures for a 3D facial model of claim 34, wherein the coordinate transformation unit transforms the transformed model coordinates input from the coordinate conversion unit by using a piece-wise linear function and outputs the transformation result as the texture coordinates.

39. The apparatus for generating textures for a 3D facial model of claim 34, wherein the coordinate transformation unit comprises a lookup table to output corresponding texture coordinates in response to the transformed model coordinates input from the coordinate conversion unit as an address.

* * * * *